United States Patent [19]

Toossi

[11] Patent Number: 5,641,133
[45] Date of Patent: Jun. 24, 1997

[54] ROTORCRAFT FUSELAGE MODAL FREQUENCY PLACEMENT USING RESILIENT MOUNTING CONNECTIONS

[75] Inventor: Mostafa Toossi, Scottsdale, Ariz.

[73] Assignee: McDonnell Douglas Helicopter Co., Mesa, Ariz.

[21] Appl. No.: 241,204

[22] Filed: May 11, 1994

[51] Int. Cl.$^6$ ............................................. B64C 27/35
[52] U.S. Cl. ........................... 244/17.27; 244/117 R; 244/131; 267/141; 248/557
[58] Field of Search .................. 244/17.27, 117 R, 244/131, 54, 17.23; 248/557, 609, 635, 638; 267/141, 141.1

[56] References Cited

U.S. PATENT DOCUMENTS

| | | |
|---|---|---|
| 1,885,571 | 11/1932 | Wilson . |
| 2,162,714 | 6/1939 | Hamblin ............................ 267/141.1 |
| 4,037,809 | 7/1977 | Legrand ............................... 244/54 |
| 4,111,386 | 9/1978 | Kenigsberg et al. . |
| 4,247,061 | 1/1981 | Kuczynski et al. . |
| 4,362,281 | 12/1982 | Cresap et al. . |
| 4,365,771 | 12/1982 | Halwes ............................. 244/17.27 |
| 4,381,902 | 5/1983 | Head et al. . |
| 5,096,153 | 3/1992 | Seeley et al. ..................... 267/141.1 |
| 5,190,244 | 3/1993 | Yana ................................. 244/17.27 |
| 5,238,206 | 8/1993 | Pachomoff ........................... 244/54 |
| 5,242,146 | 9/1993 | Tecco et al. ..................... 267/141.1 |
| 5,310,276 | 5/1994 | Bergers et al. ..................... 267/141 |

Primary Examiner—Andres Kashnikow
Assistant Examiner—Tien Dinh
Attorney, Agent, or Firm—Donald E. Stout

[57] ABSTRACT

The present invention provides a desired design approach for retuning a rotorcraft airframe by utilizing resilient connections between major airframe components. In the preferred embodiment, the design employs resilient material, preferably elastomeric material, in the mounting system between the vertical tail and the tailboom of a helicopter as a method of providing dynamic detuning of the tailboom torsion/lateral mode. Other possibilities include similarly mounting the horizontal stabilator and the wing onto the airframe. Using elastomeric or similar devices to soft mount the vertical tail of a helicopter on the tailboom can efficiently and effectively alter the natural frequencies of the entire aircraft. By choosing the spring constant of this connection, the designer can place fuselage frequency at a desired value.

18 Claims, 6 Drawing Sheets

- - - - NO RESILENT MOUNTS
······ TAIL RESILENT MOUNT
- - - - WING RESILENT MOUNT
——— BOTH OF ABOVE
——— nP EXCITATION FREQUENCY

ROTORCRAFT FUSELAGE MODAL FREQUENCY PLACEMENT USING RESILIENT MOUNTING CONNECTIONS

BACKGROUND OF THE INVENTION

This application relates to the construction of a rotorcraft, such as a helicopter, and more particularly to the concept of using resilient connections between major structural components to alter the natural frequencies of the rotorcraft airframe, thereby reducing excessive loads and vibrations.

During the design and development of rotorcraft airframes, considerable effort is expended for the purpose of ensuring that the frequencies of the major airframe natural modes are sufficiently separated from the frequencies of the driving forces generated by the rotating components. This is necessary to ensure that the dynamic environment of the airframe is acceptable, not only to the crew, but for the operation of on-board equipment, and for adequate fatigue life of the airframe components. For this reason, during the design phase of a new helicopter special attention is paid to frequency placement of the fuselage to keep its natural frequencies away from the rotating system excitation of 1/rev and n/rev. However, since the hardware is not available during this phase, such frequency placements are carried out analytically and the result, considering all the uncertainties regarding the final design, is at best approximate. Ultimately, during shake tests and/or flight tests the actual natural frequencies do not always meet expectations. If these tests prove that the natural frequencies are in fact too close to the excitation frequencies, any alterations to design at this stage are very costly and often require sacrificing some other important features.

In recent years, there has been considerable emphasis on modifying and improving existing rotorcraft platforms, rather than developing completely new designs. Often, the required modifications include mass distribution changes as well as structural changes which impact the airframe stiffness characteristics. These airframe modifications can result in significant and often detrimental changes to the placements of the major airframe modal frequencies. Changes to the rotor speed or changing the number of blades will alter the n/rev excitation frequencies. Sometimes such alteration will cause the natural frequencies of altered aircraft to be placed too close to one of the excitation frequencies of the rotor system.

Prior art solutions for detuning rotorcraft fuselages suffering from the aforementioned problem include fairly draconian measures resulting in significant disadvantages to aircraft performance and/or significant increased cost and complexity. However, it is critically important that the problem be solved by any means available. Thus, in one instance the fuselage was detuned by opening a slot therein to detune the rotorcraft from a resonance condition. The designers were aware of the structural problems such a major structural discontinuity would cause. However, short of a complete redesign of the tailboom, opening the slot was the only feasible solution available.

In another example, an existing helicopter was adapted for operation at higher altitudes by substituting a five bladed rotor for the four bladed rotor originally installed. Unfortunately, the resultant 5/rev frequency fell on the tailboom frequency and was not acceptable. Very expensive self centering servos were required to alleviate the problem.

Therefore, in order to avoid this potential problem and generally accommodate airframe frequency changes for future derivatives of existing rotorcraft, it is desirable that an improved approach be developed for tuning the airframe natural frequencies away from critical driving frequencies. The approach should be readily tailorable to the amount of tuning required, it must be cost-effective as a retrofit, it must not adversely impact other major modal frequencies, and it must not significantly alter the overall operational characteristics of the aircraft. Such an approach should not only be useful for retuning modified aircraft, but also for tuning new designs for which vibration problems are not revealed until the prototype airframe is flight tested.

SUMMARY OF THE INVENTION

The present invention provides the desired design approach for retuning a rotorcraft airframe by utilizing resilient connections between major airframe components. In the preferred embodiment, the design employs resilient material, preferably elastomeric material, in the mounting system between the vertical tail and the tailboom of a helicopter as a method of providing dynamic detuning of the tailboom torsion/lateral mode. Other possibilities include similarly mounting the horizontal stabilator and the wing onto the airframe. Using elastomeric or similar devices to soft mount the vertical tail of a helicopter on the tailboom can efficiently and effectively alter the natural frequencies of the entire aircraft. By choosing the spring constant of this connection, the designer can place fuselage frequency at a desired value.

The motion of the vertical tail has a major influence on practically all relevant airframe frequencies, particularly those associated with lateral, torsional and vertical modes. Consequently, the design of the mounting of the vertical tail on the tailboom has a significant effect on the above mentioned modal frequencies. By adjusting the spring factor of this mount, therefore, the entire spectrum of aircraft natural frequencies may be significantly altered.

Two major reasons for implementing the invention are: a) that implementation of soft mounting of the vertical tail or other components can alleviate resonance problems where they exist; and b) where soft mounting has been implemented, new frequency placements necessitated by modifications may easily be achieved by altering the spring factor of the mount. Major advantages of soft-mounting structural components over other known alternatives to achieve the goal of changing one or more natural frequencies of the entire aircraft include its simplicity, low expense, and the fact that no major redesign of the helicopter is necessary. Furthermore, once implemented, the soft mounts may easily be modified to suit new conditions, e.g. if new frequency placements are required due to further structural alterations, the soft mounts can act as an adjusting instrument. Additionally, soft mounts may easily and inexpensively be replaced, making component life not a critical issue. Finally, the spring modulus of a soft mount can easily be made variable to accommodate different needs of various flight regimes and aircraft configurations.

Thus, what is disclosed is the soft mounting of the vertical tail, or other major components, of a helicopter to alter the major dynamic characteristics of the entire aircraft.

The invention, together with additional features and advantages thereof, may best be understood by reference to the following description taken in conjunction with the accompanying illustrative drawing.

DESCRIPTION OF THE PREFERRED EMBODIMENT

Figure 1:
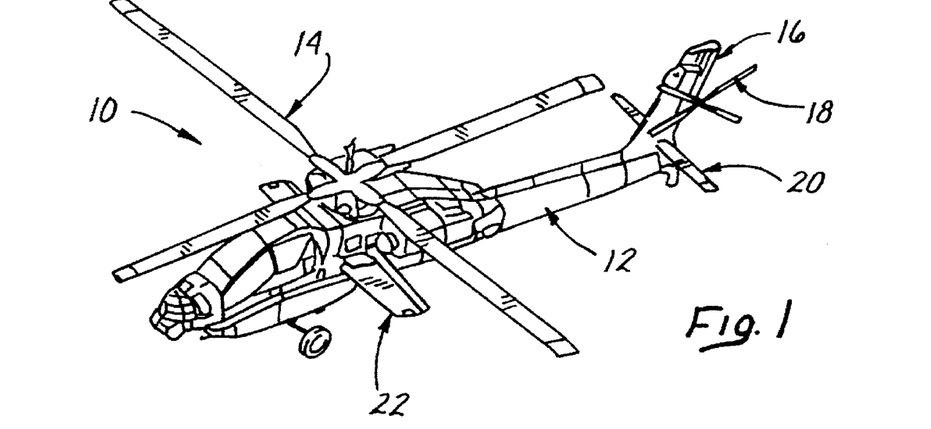
FIG. 1 is a perspective view of a rotorcraft (helicopter) into which the invention has been incorporated.

Referring now more particularly to the drawing, FIG. 1 illustrates a rotorcraft, or helicopter, 10, which, in the preferred embodiment is an AH-64 (Apache) model, manufactured by McDonnell Douglas Helicopter Company of Mesa, Ariz. It should be understood, however, that the invention is applicable to any rotorcraft, and the reference to an Apache helicopter is merely exemplary.

Still with reference to FIG. 1, the helicopter is of fairly conventional construction, having a tailboom 12, a main rotor 14, a vertical tail 16, a tail rotor 18, a stabilator 20, and a pair of wings 22.

Figures 2, 3, 4:
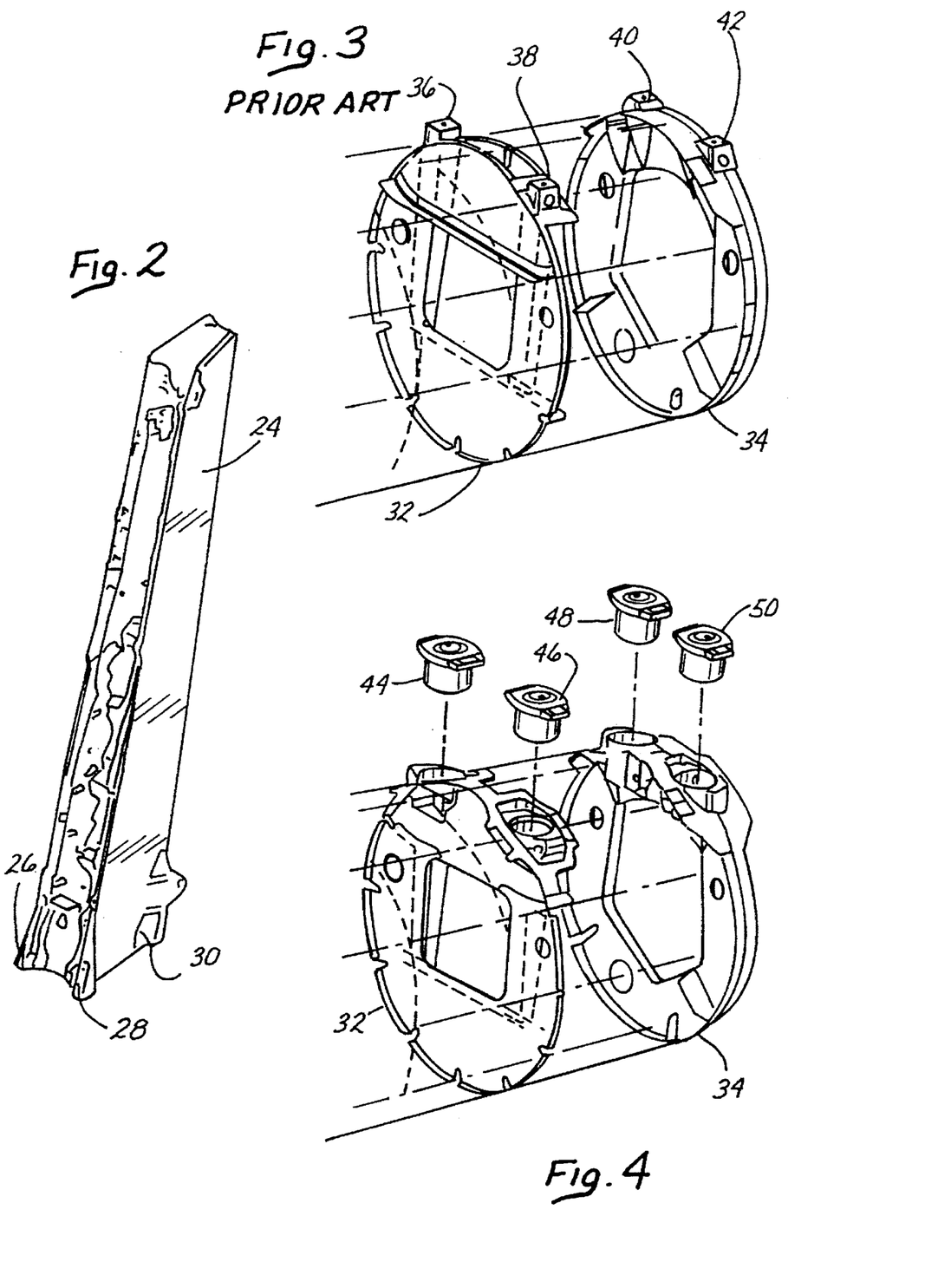
FIG. 2 is a perspective view, in isolation, of the vertical tail spar box portion of the helicopter illustrated in FIG. 1.
FIG. 3 is a schematic perspective view of the portion of the tailboom designated by reference letter A in FIG. 1, illustrating a conventional construction.
FIG. 4 is a schematic perspective view of the portion of the tailboom designated by reference letter A in FIG. 1, similar to FIG. 3, illustrating resilient attachments constructed in accordance with the principles of the invention.

Referring now to FIG. 2, the spar box portion 24 of the vertical tail, or stabilizer, 16 (FIG. 1) is shown in greater detail. At its base are four mounting points for mounting the tail onto the tailboom 12 of the aircraft. Of these four mounting points, three are illustrated and designated by reference numerals 26, 28, and 30. The tail spar 24 is designed such that belts or similar fasteners are received through the mounting points and then threaded or otherwise fastened into the tailboom frame. With reference to FIG. 3, tailboom frame members 32, 34, which are positioned in a portion of the tailboom designated by the letter A in FIG. 1, support the vertical stabilizer, and are illustrated providing a prior art method for attaching the tail spar 24 to the tailboom 12. As shown, the frame member 32 includes two hard mounts 36, 38, and the frame member 34 also includes two hard mounts 40, 42. The hard mounts are of conventional design, and have minimal resiliency. When it is desired to mount the tail spar 24 onto the tailboom 12, the mounting points 26, 28, 30 of the tail spar 24 are aligned with the hard mounts 36, 38, and 42 on frame members 32 and 34 (the other tail spar mounting point, not shown, is aligned with the hard mount 40). The tail spar is permitted to descend until the corresponding mounting points and hard mounts are in contact and alignment with one another, and then a fastener, such as a bolt, is positioned through beth the mounting point and its corresponding hard mount, and engaged by means of a nut or the like. Each connection point in the mounting is such that a flat face on the tailboom frame 32, 34 is compressed against a flat surface on the vertical tail spar box 24 by a bolt/barrel nut arrangement. The bolts are precisely torqued such that they are always in tension and the frame and vertical tail mounting surfaces are always compressed against one another under all normal loading conditions.

FIG. 4 illustrates the same frame members 32 and 34 which are shown in FIG. 3, but in FIG. 4, the frame members have been modified to incorporate the invention, comprising resilient detuning attachments designed specifically to provide the required frequency placement and damping characteristics for the first tailboom torsion/lateral natural mode. This mode is characterized by tailboom torsion coupled with fuselage lateral bending such that the lateral motion of the vertical tail is a predominant feature of the mode shape. The attachment resilience is provided by elastomeric "cartridges" which act in compression to provide the desired mount stiffness. It is of note that, while the resilient attachments are less rigid than the current bolt attachments, they are still quite stiff, with a stiffness value on the order of $10^5$ lbs/in as compared to an attachment stiffness of the current bolt arrangement on the order of $10^6$. For the inventive design, four resilient mounting cartridges 44, 46, 48, and 50, which replace the prior art hard mounts, are preferred—one at each of the existing attachment points.

Figure 5:
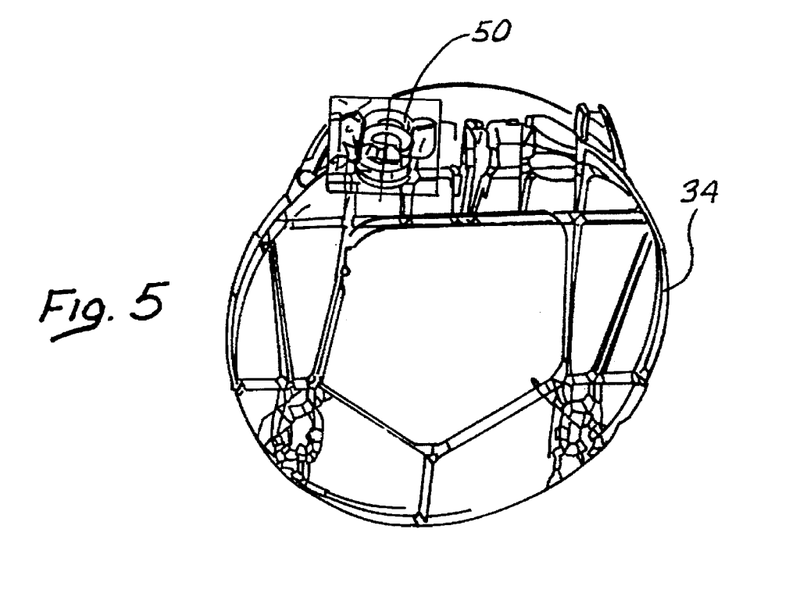
FIG. 5 is a cross-sectional view of the tailboom frame member illustrated in FIG. 4.
Figure 6:
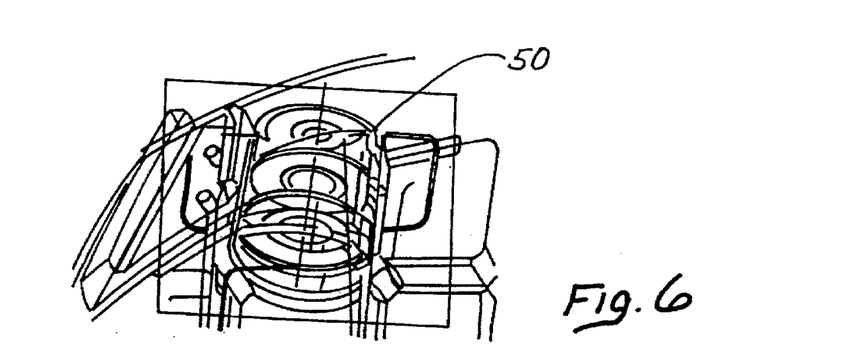
FIG. 6 is a detailed cross-sectional view taken from the portion of FIG. 5 designated by the letter B.

FIG. 5, which is a cross-sectional view of the tailboom frame member 34, illustrates in more detail the manner in which the left hand elastomeric mounting cartridge 50 is received by the frame. FIG. 6 is a more detailed view, taken from the inset B of FIG. 5. From both figures, it is clear that the cartridges are designed such that they "drop into" the frame as a modular package, easing the tasks of inspection and replacement. It should be noted that the other cartridges, not illustrated, are similarly packaged.

Figure 7:
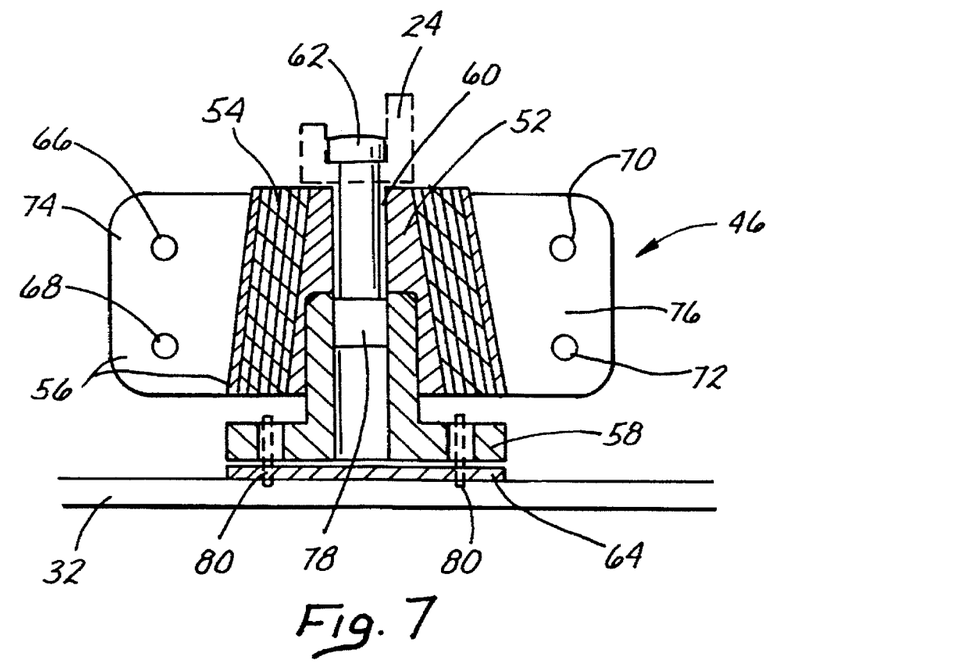
FIG. 7 is a schematic cross-sectional view of a left-hand elastomeric mounting cartridge constructed in accordance with the principles of the invention.
Figure 8:
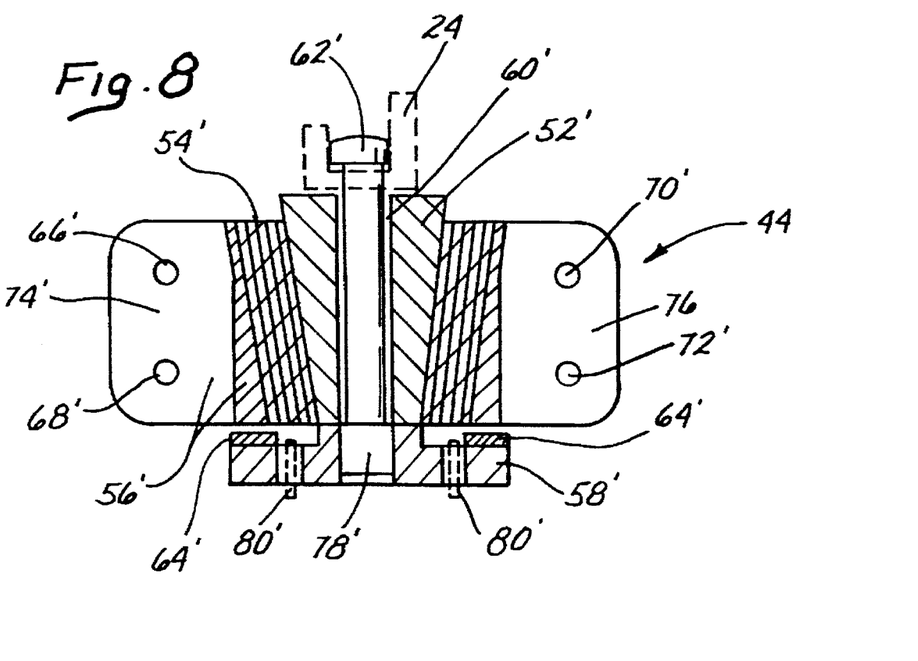
FIG. 8 is a schematic cross-sectional view of a right-hand elastomeric mounting cartridge constructed in accordance with the principles of the invention.

Now referring to FIGS. 7 and 8, FIG. 7 is a schematic cross-section of left hand mounting cartridge 46, while FIG. 8 is a similar view of right hand cartridge 44. It should be noted that the other left hand cartridge 50 and the other right hand cartridge 48 are substantially identical to the illustrated cartridges. The reason for the differences between the left hand and right hand cartridges will be explained hereinbelow. As illustrated in FIG. 7, the cartridge 46 consists of four principal parts: a center cone 52, a core elastomeric element 54, a metal housing 56, and a nut/anti-torque cylinder 58. The FIG. 8 cartridge includes the same elements, which have been identified using the same reference numeral, with a prime. Thus, in FIG. 8, the center cone is designated by the reference number 52'.

The elastomeric element 54, 54' for each mounting is a generally conically shaped bearing which is oriented in a vertical direction along the cone axis of symmetry, and is comprised of metal shims separated by thin layers of elastomeric material. It is the elastomeric material which is the active part of the mounting. The element absorbs load in a combination of compression in the thin elastomeric coatings and shear between the steel shims. The effective compressive stiffness is controlled by the number of elastomeric/metal shim layers as well as the type of elastomer and the layer thicknesses, and by the cone angle. The stiffness as well as the fatigue life requirements determine the bearing size. In the preferred embodiment, the bearing is sized for the desired frequency placement and for about 2500 hours of life under the anticipated loading spectrum of the attachment.

The conical shape of the bearing prevents separation of the element layers in the primary load direction. This feature dictates the orientation of the bearing at each of the mounting points. On the left-hand side of each of the frames 32, 34, the bearings are oriented such that the smaller ends of the cone are up as shown in FIG. 7. On the right hand side, the bearings 54' are oriented with the smaller ends down, as shown in FIG. 8. This reflects the predominant in-flight loading of the vertical tail which is to the right, resulting in download at the right-hand attachments and upload at the left-hand attachments. Hence, the left hand bearings are oriented such that the elastomeric material is in compression for the predominant up-load for which the bearings, by design, are stronger; and the right-hand bearings are also oriented such that the elastomeric layers are in compression and are stronger for the predominant down-load. However, even though the bearings are oriented differently between the right and left sides, their basic geometric dimensions are identical.

In both FIG. 7 and FIG. 8, the center cones 52, 52' are preferably fabricated of a metal such as steel, with a net fit hole 60, 60' in the center to receive the vertical tail mounting bolt. The exterior is sized to interface with the elastomeric element 54, 54'. The lower end is recessed to receive the nut/anti-torque cylinder 58, 58'. It should be noted that, with respect to the right-hand bearings (FIG. 8), the center cone is preferably extended vertically above the elastomeric element 54 to accommodate deformation of the bearing core 54'.

The center axis of the nut/anti-torque cylinder 58, 58', which is inserted inside the lower end of the center cone 52, 52', is preferably threaded to receive a vertical tail attachment bolt 62, 62', which interconnects the tail spar 24 at one of the mounting points 26, 28, 30, or the other point which is not shown, with the tailboom frame members 32, 34. The lower cylindrical portion of the component is drilled with pin holes to be used on installation to prevent windup of the bolt during the torquing operation. For a very few severe loading conditions (e.g. those caused by extreme gusts), it has been discovered that the load can reverse such that the left-hand side has a down-load and an up-load is imposed on the right-hand side. For this purpose, in the case of the left-hand mount 46, the nut/anti-torque cylinder lower surface contacts the frame member through an elastomeric snubber pad 64 to transfer the reverse downward load of the vertical tail. On the right-hand side, the nut/anti-torque cylinder 58' lower surface contacts the housing in a similar manner for the reverse upward condition, so an elastomeric snubber pad 64' is provided on the upper side of the nut/anti-torque cylinder 58' to compensate for the reverse upward condition.

The inner surface of the outer housing 56, 56' is sized to receive the outer surface of the elastomeric element 54, 54', respectively. The housing is the primary load path and has four attachment holes, 66, 68, 70, and 72 (66', 68', 70', and 72' for the FIG. 8 cartridge), two on either side in the "butterfly" brackets 74 and 76 (74' and 76' for the FIG. 8 cartridge). These holes function to transfer the load, via a fastener shear arrangement, to the frame. As this is the point where fatigue is a consideration, much attention has been paid to the design of this joint.

Still referring to both FIGS. 7 and 8, the vertical stabilizer/tailboom attachment bolt 62, 62' is torqued up against a nut 78, 78' in the nut/anti-torque cylinder to put the bolt in tension and the center cone 52, 52' in compression. This ensures that the joint is preloaded to a level where tension loads on the bolt prevent the compression levels from going to zero under any conceivable operating conditions.

Anti-torque pins 80 (FIG. 7) and 80' (FIG. 8) are also utilized to ensure that the nut/anti-torque cylinders 58, 58', respectively, are maintained in their desired position rotationally.

To summarize the advantages of the inventive arrangement over the prior art, it is noted that the vertical tail/tailboom joint at issue is designed, for fail-safety, to operate for some period of time with one bolt failed. Further contributing to fail-safety is the fact that the conical bearings are positioned with their smaller diameter sides upward on the left-hand side and downward on their right sides to reflect nominal loading of the attachment and accommodate bearing failure. This guarantees that complete failure of the elastomeric element will not destroy the load path between the vertical tail and tailboom frames, since the larger end of the cone is caught by the smaller end.

An additional feature includes the fact that the four vertical tail mounting surfaces are in compression with the four mounting surfaces on the frames 32, 34 for all extremes of vertical tail loading. The mount flexibility is actually introduced somewhat below the tail/tailboom attachment points at the locations of the elastomeric bearings. The bearings function in shear deformation caused by the varying compression load from the vertical tail.

Yet another feature provides a load reversal pad beneath the left-hand bearings, and an extended lip on the lower nut cylinder of the right-hand bearing to provide stops for the rare instances when the attachment loads are reversed. The magnitude of the reversing load is quite small compared to the load in the predominant direction.

Now with particular respect to the preferred embodiment, it is preferred that the stiffness and damping requirements for the elastomer to be used in the desired implementation be predicted based on eigenanalysis of the full airframe using specialized engineering software, such as NASTRAN. Of course, many other methods of calculating these values for a particular preferred application could be utilized as well, including manual calculations, although this would be very tedious. In practice, the assignee for the instant patent application extensively correlated predictive data from a detailed NASTRAN analysis with flight test natural frequency data from AH-64 aircraft not employing the inventive mounts, but instead employing alternative means for changing modal frequencies. The flight test data provided measurements of the changes in a number of major modal frequencies, including first torsion/lateral and first vertical, and confirmed the good correlation of the NASTRAN predictions with those measurements, providing confidence in the NASTRAN predictions of modal frequency changes with these conditions.

Figure 13:
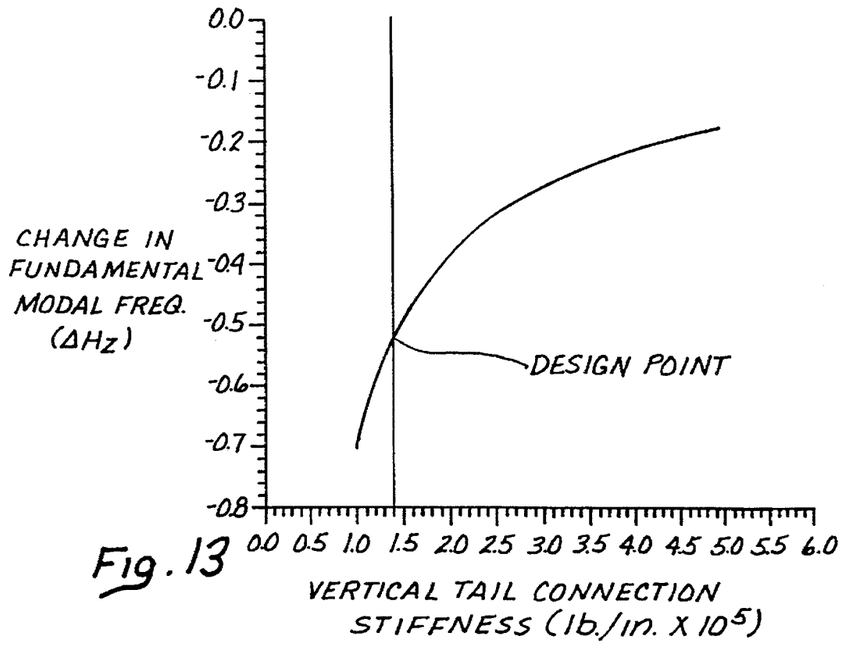
FIG. 13 is a plot of the change in fundamental nodal frequency vs. vertical tail connection stiffness, based on NASTRAN analysis, for one particular preferred embodiment (an AH-64 helicopter utilizing the resilient mounts illustrated in FIGS. 7 and 8)

Based on NASTRAN analysis, the stiffness required to provide adequate separation of the first boom torsion/lateral mode and main rotor rotational frequency 1 P is about 100,000 to 200,000 pounds per inch of deflection, as shown in FIG. 13. The four mounts are modeled using translational springs of stiffness equivalent to the composite stiffness of the entire juncture, which includes the bolt stiffness (in tension) and the frame/spar surface interaction. For the elastomeric mounts, the elastomer is the least stiff spring in the series, and therefore the composite stiffness is essentially the stiffness of the bearing itself. Based on the stiffness requirement shown in FIG. 13 (in addition to ultimate design loads and operational loads), a bearing may be sized for the design mounts. While it is preferred that all four bearings be identical, it may be desirable in some instances to utilize an asymmetric bearing stiffness configuration to control the impact of the design on critical modes other than the first tailboom torsion/lateral mode.

A modal comparison (mode shapes and frequencies) has been made of the NASTRAN-predicted natural frequencies of the AH-64 helicopter as currently produced with hard mount bolt attachments and the inventive resilient mount configuration. This comparison confirmed that the modal character is preserved by the inventive design; i.e. the mode shapes remain relatively unchanged while the frequencies shift as desired. Table 1 shows a summary of these NASTRAN predictions in terms of changes in the critical natural frequencies of the AH-64 aircraft equipped with the inventive preferred elastomeric vertical tail mounts, as compared to the current state of the art production aircraft.

TABLE 1

Changes in critical mode frequencies with incorporation of resilient vertical tail mounts

| MODE | REDUCTION IN FREQUENCY ($\Delta$Hz) |
| --- | --- |
| First boom torsion/lateral | −0.52 |
| First vertical bending | −0.31 |
| Second vertical bending | −0.12 |

Figure 14:
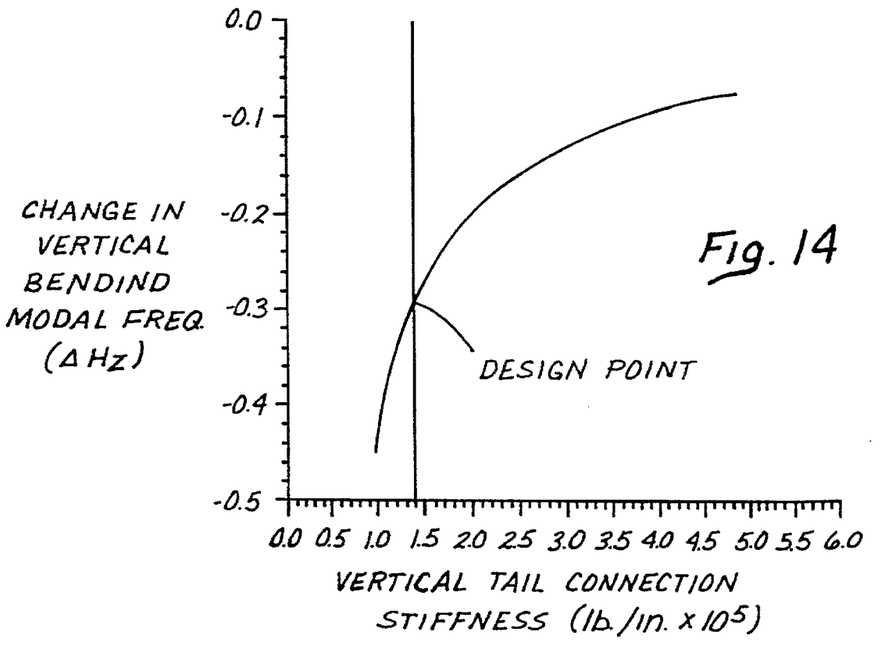
FIG. 14 is a plot of the change in vertical bending modal frequency vs. the vertical tail connection stiffness for the same embodiment as in FIG. 13.

As can be seen from the results, by design, the frequency of the first boom torsion/lateral mode is reduced by the amount necessary to exactly overcome the frequency increase due to the planned structural modifications. Second vertical bending mode is below 4 P (as measured in flight), and thus the frequency reduction resulting from the resilient mounts is favorable. First vertical bending mode, which is above 1 P for the current production design, is moved closer to 1 P for the resilient mounting design by 0.28 Hz. If this becomes problematic, the proposed design concept allows independent tuning of these modes. In fact, this was a prerequisite for the detuning design. If it is necessary to restrict the movement of the first vertical bending frequency, using an asymmetric bearing stiffness forward and aft, or using an asymmetric stiffness on the right side and left side, such an approach is possible. FIG. 14 shows the change in the vertical bending mode with vertical connection stiffness. Analysis shows that use of the stiffer bearings on the right hand side (with stiffness on the order of 500,000 lb/in) will result in acceptable placement of both modes.

It should be noted that, though the elastomeric mounting systems provide greater resiliency so as to favorably change the modal frequencies of the rotorcraft, in absolute terms, the inventive design has very limited impact on overall aircraft deformations. Because of this, the aircraft does not handle in flight noticeably differently when equipped with the elastomeric vertical tail mounts. In fact, the system damping is actually favorably increased by incorporation of the inventive design concept. One initial point of concern was the alignment of the tail rotor drive shaft on either side of the intermediate gear box in the presence of greater relative displacement between the vertical tail and the tailboom, primarily in torsional rotations, because of the elastomeric mounts. However, in fact, the center of torsion of the boom/empennage system for the natural mode of interest of the present production aircraft (having hard mounts) is roughly at the centerline of the boom. The center of rotation of the empennage for the inventive configuration is at the location of the elastomeric bearings, i.e. at the point of attachment of the vertical tail and the tailboom. This point of attachment is much closer to the intermediate gearbox than the boom centerline, and thus the translational motion on either side of the intermediate gearbox in the lateral direction is actually less for the subject design than for the present configuration. For torsional deformations, the rotational deflections of the drive shaft caused by airframe deformation are small compared to the deflections due to the drive shaft loads themselves. Therefore, the small change in the already negligible drive shaft rotation due to the new mount design is also negligible.

Figure 11:
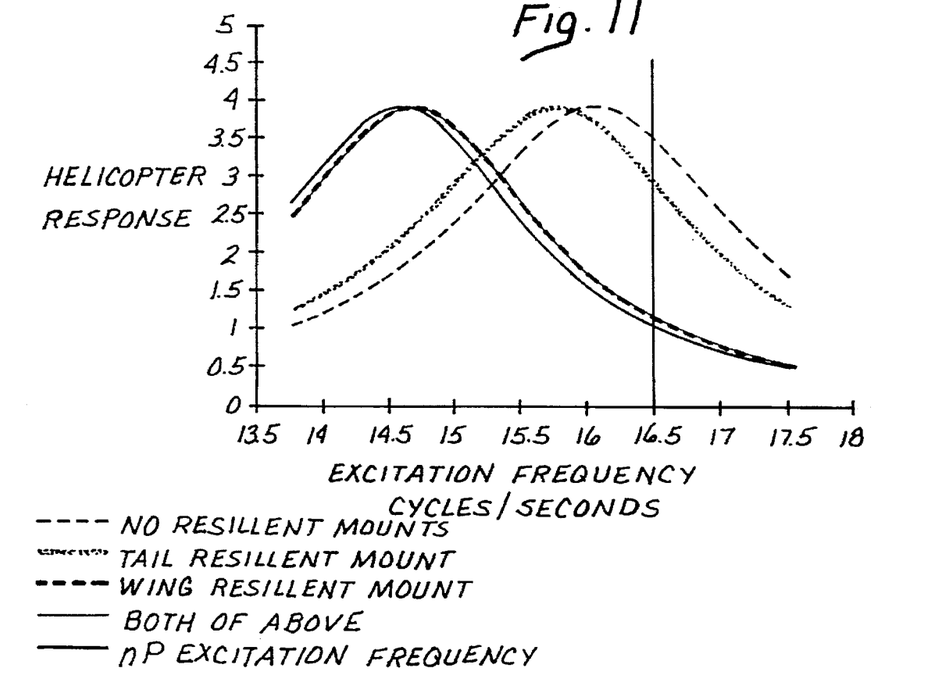
FIG. 11 is a plot of helicopter response vs. excitation frequency for the case of an AH-64 helicopter.

Now referring to FIG. 11, an example plot for the case of an AH-64 helicopter is depicted, wherein the fuselage natural frequency is close to its rotor passage excitation frequency of 16.5 Hz. This mode may be excited by air loads at nP frequency striking upon some aircraft components such as its wings, vertical stabilizer, or its horizontal stabilator. The same mode may also be excited by the loads at nP frequency traveling through the hub and pylon into the fuselage. The purpose of the present invention is not to affect load transmission by placing soft mounts on the load path, but rather to use resilient connections to alter the natural frequency of that particular mode of the entire aircraft; i.e. de-tune it. Once the aircraft is de-tuned, it will not respond to any loading with the blade passage frequency, and, hence, there will not be any loading to worry about. In accordance with the instant disclosure, placing the resilient mounts at a multitude of locations can achieve the desired objective, though the tail mount is preferred. Assuming that engines, wings, stabilator and the stabilizer participate in the mode of interest, such locations may include: between the engines and the engine mounts, between the wings and the fuselage, between the vertical stabilizer and the tailboom, at the construction joint of the tailboom, any combination of the above, or some other location not herein described.

Depicted are plots for the case of no resilient mounts, a tail resilient mount only, a wing resilient mount only, and both a tail and a wing resilient mount. As is evident from the graph, where no resilient connection has been used, the mode and frequency of the aircraft is about 16.15 Hz, which is too close to the blade passage frequency of 16.5 Hz. Where resilient connections have been used in connecting the vertical tail to the fuselage (with the stiffness of each of the four connections is about 100,000 lbs/inch), the mode and frequency is about 15.9, which is still too close to the blade passage frequency of 16.5 Hz. However, where resilient connections have been used to connect the wings to the fuselage, the mode and frequency is about 14.82 Hz, which is almost acceptable (:again, the stiffness of each of the connection points is about 100,000 lb/in). Finally, where resilient connections have been used to connect both the wings and the vertical tail to the fuselage (with the stiffness of each of the connections still being about 100,000 lbs/inch), the mode and frequency drops to about 14.72 Hz, which may be considered acceptable.

Of course, the ultimate choice as to where to place the resilient mounts is made based upon issues which include practicality, degree of effectiveness, safety, and cost, to list a few.

Figure 12:
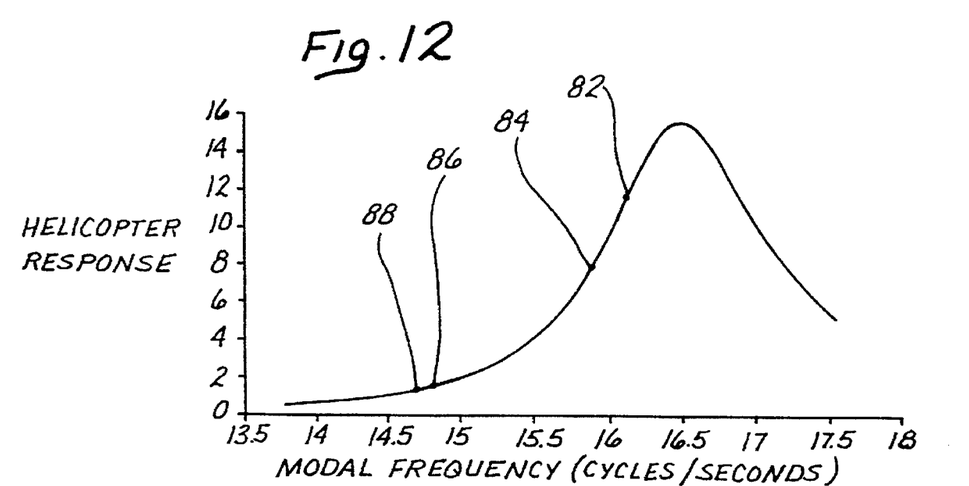
FIG. 12 is a plot depicting the response illustrated in FIG. 11, for each of several possible elastomeric joint locations, on a single curve.

FIG. 12 depicts the response illustrated in FIG. 11, for each of the discussed possible elastomeric joint locations, on a single curve which illustrates, for the AH-64 example, the helicopter's change of response to nP=16.5 Hz due to a shift in natural frequency caused by each of the inventive resilient connections. Point 82 on the response curve represents the response with no resilient mounts, point 84 represents the response with resilient mounts on the vertical tail, point 86 represents the response with resilient mounts on the wings, and point 88 represents the response with resilient mounts on both the wings and the tail.

Figures 9, 10:
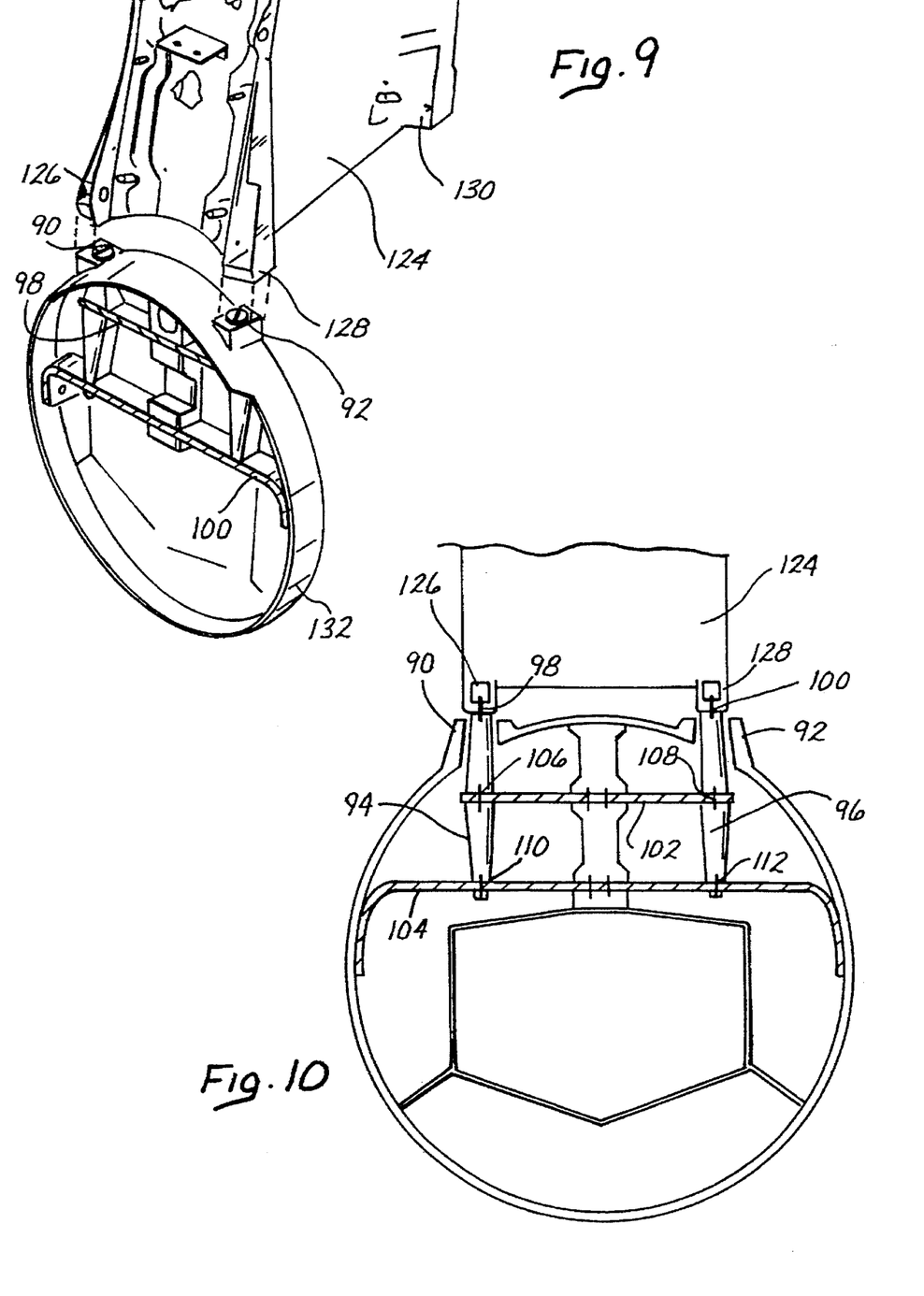
FIG. 9 is a perspective view of a tailboom frame member of a helicopter, similar to FIG. 4, illustrating an alternative embodiment for attaching a tail spar to a tailboom frame member.
FIG. 10 is a cross-sectional view of the tailboom frame member illustrated in FIG. 9.

Referring now to FIGS. 9 and 10, an alternative embodiment to the preferred elastomeric bearing embodiment illustrated in FIGS. 7–8, in particular, is shown for soft-mounting the vertical tail. The illustrated alternative embodiment employs a leaf spring mount, wherein like elements to those in the first embodiment are designated by like reference numerals, preceded by a 1. Thus, the tail spar 124 is mounted onto the tailboom frame member 132 by means of mounting points 126, 128, and 130. The frame member 132 includes two mounts 90 and 92, with which the mounting points 126 and 128 engage, precisely as in the first embodiment (the other frame member, not shown, is substantially identical and has two additional mounts for engagement with the mounting point 130 and the other mounting point (not shown) on the tail spar 124). However, the spar 124 is attached to the frame member 132 by means of attachment members 94 and 96, which are adapted for attachment to the mounting points 126 and 128 using hooks 98, 100. Two leaf springs 102, 104 are employed to provide resiliency to the mount. The leaf springs are attached to the attachment members 94, 96 by means of additional hooks 106, 108, 110, and 112, as shown.

Many other alternative resilient mounting mechanisms could be employed as well, such as mounts using disk springs, leaf springs, and long connecting bolts.

Thus, the invention constitutes a new method for providing flexibility to connections between major structural elements of a rotorcraft airframe, to permit relative motion between the elements and thereby alter not only that component's local dynamic behavior, but the overall dynamic behavior of the host structure (aircraft) or other components. It has wide applicability not only for rotorcraft, but for all aircraft, and perhaps other structures as well.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A rotorcraft having a substantially vertical tail and a tailboom having an axis bisecting a left side and a right side thereof, said rotorcraft further comprising:

at least one connection apparatus attaching said tail and said tailboom to one another on the left side of said tailboom and at least one connection apparatus attaching said tail and said tailboom on the right side of the tailboom, each connection apparatus including a modular elastomeric cartridge comprising a center cone member, a core elastomeric member substantially surrounding said center cone member, and a housing enclosing said center cone member and said core elastomeric member, the elastomeric cartridge in each said connection apparatus having a generally conical shape, with a diametrically smaller end and a diametrically larger end;

wherein the elastomeric cartridge on one side of the tailboom is mounted with its smaller end oriented downwardly and the elastomeric cartridge on the other side of said tailboom is mounted with its smaller end oriented upwardly.

2. A rotorcraft as recited in claim 1, wherein the elastomeric cartridge on the left side of the tailboom is mounted with its smaller end oriented upwardly and the elastomeric cartridge on the right side of the tailboom is mounted with its larger end oriented upwardly.

3. A rotorcraft as recited in claim 1, wherein the core elastomeric member comprises a generally conically shaped bearing having metal shims separated by layers of elastomeric material, the number of elastomeric/metal shim layers combined with the type of elastomer, the layer thicknesses, and the cone angle determining the effective compressive stiffness or resilience factor of the elastomeric element.

4. A rotorcraft as recited in claim 1, wherein said center cone member comprises a center hole for receiving a mounting bolt and a nut/anti-torque cylinder, said nut/anti-torque cylinder being threaded at one end to receive the threaded end of said mounting bolt.

5. A rotorcraft having an airframe which includes a substantially vertical tail and tailboom; the rotorcraft further comprising:

at least one connection apparatus for attaching said tail and tailboom together, said connection apparatus having a predetermined resilience factor so that the attached tail and tailboom may move relative to one another and thereby alter the natural response frequencies of the rotorcraft;

said predetermined resilience factor of said at least one connection apparatus being adapted to be modified so that the natural response frequencies of said rotorcraft may be modified.

6. A rotorcraft as recited in claim 5, wherein said connection apparatus includes an elastomeric cartridge.

7. A rotorcraft as recited in claim 5, wherein said elastomeric cartridge is modular, and the predetermined resilience factor of said at least one connection apparatus is adapted to be modified by exchanging said elastomeric cartridge for another elastomeric cartridge having a different predetermined resilience factor.

8. A rotorcraft as recited in claim 5, wherein each of said elastomeric cartridges comprise a center cone member, a core elastomeric member substantially surrounding said center cone member, and a housing enclosing said center cone member and said core elastomeric member.

9. A method of re-tuning a rotorcraft airframe which includes a substantially vertical tail and a tailboom oriented generally transversely thereto, the method comprising the steps of:

a) determining at least one natural frequency of substantially the entire rotorcraft airframe;

b) determining a desired magnitude and direction of change of said at least one natural frequency;

c) determining a desired resiliency factor for a connector adapted to couple said vertical tail to said tailboom, responsive to the values determined in steps a) and b), in order to alter the natural frequency of the rotorcraft airframe; and d) employing at least one connector having said desired resiliency factor to couple said vertical tail to said tailboom.

10. A method as recited in claim 9, wherein step b) is performed by determining critical driving frequencies of the rotorcraft and calculating rotorcraft natural frequencies sufficiently different to prevent resonance between the critical driving frequencies and the rotorcraft natural frequencies.

11. A method as recited in claim 10, wherein the critical driving frequencies comprise the rotor blade passage excitation frequencies.

12. A method as recited in claim 11, wherein said coupling step is accomplished using four resilient connectors, said resilient connectors further comprising elastomeric cartridges.

13. A method of re-tuning a rotorcraft airframe which includes a plurality of major structural components in order to alter one or more natural frequencies of substantially the entire rotorcraft, at least two of said major structural components, neither of which comprise a main rotor of the rotorcraft, being coupled together by means of at least one connector device having a predetermined resiliency factor, the method comprising the steps of:

a) determining at least one natural frequency of substantially the entire rotorcraft airframe;

b) determining a desired magnitude and direction of change of said at least one natural frequency; and c) modifying the resiliency factor of said at least one connector device responsive to the determinations made in steps a) and b) to thereby alter the natural frequency of said airframe.

14. A method as recited in claim 13, wherein step b) is performed by determining critical driving frequencies of the rotorcraft and calculating rotorcraft natural frequencies sufficiently different to prevent resonance between the critical driving frequencies and the rotorcraft natural frequencies.

15. A method as recited in claim 14, wherein the critical driving frequencies comprise the rotor blade passage excitation frequencies.

16. A method as recited in claim 13, wherein said rotorcraft airframe includes a substantially vertical tail and a tailboom oriented generally transversely thereto, said at least two major structural components comprising said vertical tail and said tailboom.

17. A method as recited in claim 13, said at least one resilient connector device including a modular resilient element having said predetermined resiliency factor, wherein step c is performed by interchanging said modular resilient element with another modular resilient element having a different resiliency factor.

18. A method as recited in claim 17, wherein said resilient connector device comprises an elastomeric cartridge having a predetermined spring factor.

* * * * *